(12) United States Patent
Adiba

(10) Patent No.: US 11,759,896 B2
(45) Date of Patent: Sep. 19, 2023

(54) DEVICE FOR DISTRIBUTING CLIP-TYPE COMPONENTS

(71) Applicant: NOVARES FRANCE, Clamart (FR)

(72) Inventor: Laurent Adiba, Valforet (FR)

(73) Assignee: NOVARES FRANCE, Clamart (FR)

( * ) Notice: Subject to any disclaimer, the term of this patent is extended or adjusted under 35 U.S.C. 154(b) by 55 days.

(21) Appl. No.: 17/613,703

(22) PCT Filed: May 28, 2020

(86) PCT No.: PCT/FR2020/050906
§ 371 (c)(1),
(2) Date: Nov. 23, 2021

(87) PCT Pub. No.: WO2020/240142
PCT Pub. Date: Dec. 3, 2020

(65) Prior Publication Data
US 2022/0234152 A1 Jul. 28, 2022

Related U.S. Application Data

(63) Continuation-in-part of application No. PCT/FR2020/050906, filed on May 28, 2020.

(30) Foreign Application Priority Data

May 29, 2019 (FR) ...................... 19/05772

(51) Int. Cl.
*B65G 47/14* (2006.01)
*B65G 27/34* (2006.01)
*B23P 19/00* (2006.01)

(52) U.S. Cl.
CPC ............ *B23P 19/001* (2013.01); *B65G 27/34* (2013.01); *B65G 47/1492* (2013.01); *B65G 2203/0225* (2013.01); *B65G 2203/044* (2013.01)

(58) Field of Classification Search
CPC .... B65G 27/34; B65G 47/14; B65G 47/1407; B65G 47/1492; B23P 19/00; B23P 19/0001; B23P 19/002; B23P 19/003; B23P 19/004
See application file for complete search history.

(56) References Cited

U.S. PATENT DOCUMENTS 5,489,019 A * 2/1996 DiNanno ............ B65G 47/1492
193/25 FT
5,967,293 A * 10/1999 Gaines ................ H05K 13/028
198/531

(Continued)

FOREIGN PATENT DOCUMENTS

CN 106475773 A 3/2017
FR 2946035 A1 12/2010
(Continued)

OTHER PUBLICATIONS

US 2018/0299474 A1, Nakamura, Oct. 18, 2018.*
(Continued)

*Primary Examiner* — Douglas A Hess
(74) *Attorney, Agent, or Firm* — CANTOR COLBURN LLP

(57) ABSTRACT

A device for distributing clip-type components for assembling parts includes a main magazine for bulk storage of the components, a tray for temporary storage of components extracted from the main magazine, configured to temporarily store the components to be transferred out of the device and mounted for reciprocating translation in a longitudinal direction to shake the temporarily stored components and facilitate their positioning inside the tray in a predetermined stable position corresponding to their shape. The device includes an optical detection system to detect, from among the components temporarily stored inside the temporary storage tray, the components having the predetermined (Continued)

stable position, and a transfer system to transfer the components having the predetermined stable position to a downstream processing area outside the device. The device further includes an electronic control unit connected to the optical detection system and the transfer system, the unit configured to control the transfer system.

9 Claims, 3 Drawing Sheets

(56) References Cited

U.S. PATENT DOCUMENTS

| | | | | |
|---|---|---|---|---|
| 6,688,489 | B2* | 2/2004 | Bloch | B23P 19/001 227/112 |
| 8,136,651 | B2* | 3/2012 | Cassoni | B67B 3/0645 198/408 |
| 8,789,446 | B1* | 7/2014 | Sungkhaphong | B23P 19/003 81/57.37 |
| 10,238,145 | B2* | 3/2019 | Guenther, Jr. | A24F 40/70 |
| 10,336,554 | B1* | 7/2019 | Kolodziej | B23P 19/002 |
| 11,167,339 | B2* | 11/2021 | Eusterwiemann | B21J 15/28 |
| 11,299,349 | B2* | 4/2022 | Kira | B25B 23/04 |
| 11,376,652 | B2* | 7/2022 | Chevalier | B23P 19/006 |
| 11,548,058 | B2* | 1/2023 | Eusterwiemann | B23P 19/001 |

FOREIGN PATENT DOCUMENTS

| | | | |
|---|---|---|---|
| FR | 3058082 A1 | 5/2018 | |
| WO | 2010004211 A2 | 1/2010 | |
| WO | 2010089290 A1 | 8/2010 | |
| WO | WO-2020128819 A1 * | 6/2020 | B65G 47/14 |

OTHER PUBLICATIONS

International Search Report dated Oct. 7, 2020 re: Application No. PCT/FR2020/050906, pp. 1-2, citing: WO 2010089290 A1, FR 3058082 A1 and FR 2946035 A1.

* cited by examiner

DEVICE FOR DISTRIBUTING CLIP-TYPE COMPONENTS

TECHNICAL FIELD

The present disclosure concerns a device for dispensing plastic or metal clip-type components intended in particular to assemble parts. Such components are intended to be set in place by snap-fitting onto parts which, subsequently, will be clipped onto supports. In general, these clips comprise a head configured to be snap-fitted onto the part, and a foot configured to be snap-fitted onto the support. For example, such clips may be used when mounting plastic parts inside or outside a motor vehicle.

BACKGROUND

Currently, clips dispensing devices generally comprise a vibrating bowl in which the clips are stored in bulk and guide rails for conveying the clips from the vibrating bowl to the workstations of an assembly line. However, these known dispensing devices have the drawback of being complex to implement. In addition, blocking problems frequently occur in the vibratory bowl and the guide rails due to improper positioning of the clips. These blockages therefore generate production shutdowns which greatly limit the supply rates of the clips.

Moreover, there is also known a dispensing device which is based on the use of a vibrating table on which clip-type components are poured and which, by the vibration of the table, are positioned in a predetermined stable position. An optical device, of the camera type, placed directly above the table makes it possible to detect properly positioned components. This information is then transmitted to a control unit which controls the displacement of the robot's gripping arm so as to pick up only the properly positioned components and then transfer them to a downstream processing area. However, this device has the drawback of not being suitable for three-dimensional components whose external shape does not allow a stable position to be reached on the vibrating table. In particular, in the case of clips having a shell-like shaped foot and a disc-like shape head, it is almost impossible to keep the clip in stable equilibrium on the table when the latter is vibrating. This device therefore works effectively only for clips having a very specific shape. In particular, to maintain a stable equilibrium position, the clips must have a very flat head and a large diameter of this head to prevent tilting thereof during the vibration of the table.

SUMMARY

In this technical context, an aim of the disclosure is to provide a device for dispensing clip-type components which does not have the drawbacks of the aforementioned prior art.

To this end, the disclosure concerns a device for dispensing clip-type components intended in particular to assemble parts, comprising:
- a main store for bulk storage of said components,
- a temporary storage tray for components extracted from the main store configured to temporarily store the components waiting to be transferred out of the device, said tray being mounted in reciprocating translation in at least one longitudinal direction so as to be able to agitate said temporarily stored components and promote positioning thereof inside said tray according to at least one predetermined stable position related to their shape,
- an optical detection system configured to detect, among the components temporarily stored inside the temporary storage tray, those having said predetermined stable position,
- a transfer system configured to transfer, individually or in groups, the components having said predetermined stable position to a downstream processing area located outside the device,
- an electronic control unit in electronic connection with the optical detection system and the transfer system, said unit being configured to control the transfer system in particular as a function of detection signals received from the optical detection system,
characterized in that the temporary storage tray is provided with a series of individual housings, each of said housings being configured to receive one single component according to said predetermined stable position.

Configured in this manner, the disclosure makes it possible to promote the stable positioning of the components at the level of the temporary storage tray by the presence of individual housings in which the components could be housed in a stable equilibrium position, thus greatly limiting the risk of a subsequent tilting of the components into an unstable position due to the agitation induced by the tray. Once in their stable equilibrium position, the components could be easily picked up by the transfer system and be then transferred to a downstream processing area.

The device of the disclosure may comprise one or more of the following features, considered alone or in combination:
- each of the individual housings forms a through opening inside the temporary storage tray, said opening being configured to enable the passage of a first portion of the components and prevent the passage of a second portion of the components.
- the geometry of the opening is adapted to that of the considered component.
- each through opening has a circular-shaped section, the geometry of this opening being adapted to that of the considered component.
- the individual housings are distributed over the temporary storage tray according to the geometry of the component.
- the individual housings are regularly spaced over the temporary storage tray.
- the individual housings are scattered over the temporary storage tray in a regular alignment of rows and columns.
- the optical detection system comprises an optical camera oriented to view the temporary storage tray from above and an image processing software adapted to receive and analyze the images captured by the optical camera so as to detect the components stored on the temporary storage tray having the predetermined stable position.
- the transfer system comprises a robot with an articulated arm and having at least one gripping finger configured to individually grip the components stored on the temporary storage tray having the predetermined stable position.

BRIEF DESCRIPTION OF THE DRAWINGS

The disclosure will be better understood upon reading the non-limiting description which follows, made with reference to the appended figures.

FIG. 1a is a perspective view of a possible variant of a temporary storage tray usable in the device represented in FIG. 1.

DETAILED DESCRIPTION OF THE DRAWINGS

Figure 1:
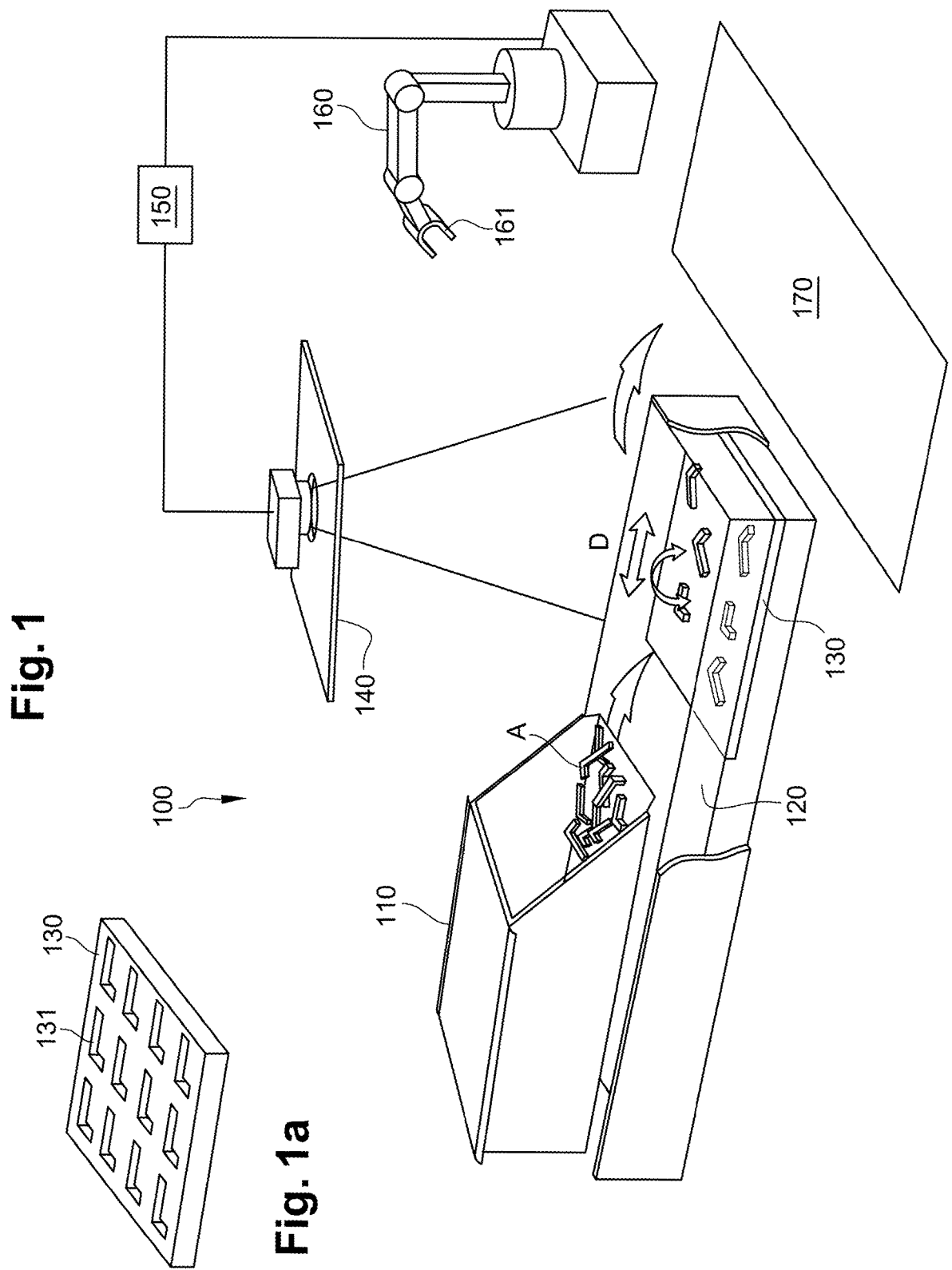
FIG. 1 is a schematic view of a component dispensing device according to the disclosure.

Referring to FIG. 1, a dispensing device 1 according to a first configuration of the disclosure is represented. This device 1 comprises in particular a main store 110 making it possible to receive components A having various shapes in bulk. A conveying table 120 disposed under the main store 110 and supporting a temporary storage tray 130 can move in a longitudinal direction D so as to move the tray 130 away from or closer to the main store 110. Thus, after having properly positioned the tray 130 under the main store 110, it is possible to pour a number of components A contained in the main store 110 onto the tray 130. The components A are then disposed randomly at the surface of the tray 130, whether with regards to their positioning in the plane defined by the tray 130, but also with regards to their orientation in the space.

In order to enable the components A to adopt the most stable position possible on the tray 130, that is to say the position in which they have the lowest possible potential energy, generally corresponding to the position in which their mass center is at its lowest point, the tray 130 is then displaced in a series of reciprocating movements back and forth, parallel to the direction D, or transversely or else along a Z axis around a middle position. These reciprocating movements cause agitation of the components A which modify their orientation and their positioning on the tray 130. Thus, as illustrated in FIG. 1, in the case of L-shaped components A, some of the components A could for example tilt from an unstable position, in which they are standing on the tray 130, to a stable position, in which they are lying on the tray 130. The device 100 further promotes this passage from an unstable position to a stable position by providing the tray 130 with a series of individual housings 131, as represented in FIG. 1a. Each of the housings 131 is configured to at least partially contain one single component A. Thus, in the specific represented example, each of the housings 131 forms a cavity at the upper surface of the tray 130, said cavities having an L-shape substantially complementary to that of the components A. The housings 131 are scattered in a regularly spaced manner at the surface of the tray and advantageously have a row and column distribution. Configured in this manner, the temporary storage tray 130 will make it possible to receive in the housings 131 the components A that would have been displaced, due to the agitation of the tray, so as to be in the lying position and properly positioned to be received inside the housings 131. The components A disposed in this manner in the housings 131 will keep a fixed position with respect to the tray 130. An optical detection device 140, of the camera type for example, positioned above the tray 130 will allow the entire tray 130 to be viewed and the output signal delivered by said optical detection device 140 may be analyzed by digital processing software so as to detect the components A having a predetermined position. Thus, in the example represented in FIG. 1, the optical detection device 140 will be able to detect at any time the components A that are positioned inside the housings 131. Once this detection has been performed, the optical detection device 140 transmits the corresponding information to a control unit 150 which is in electronic communication with a transfer apparatus 160, of the robot type for example, so as to indicate to it that it could take individually, thanks to a gripping means such as a gripping finger 161, for example, or a clamp, or in a grouped manner the components A having the predetermined position. The transfer apparatus 160 is then responsible for transferring said components A to a downstream processing area 170 located outside the dispensing device 100.

Figure 2:
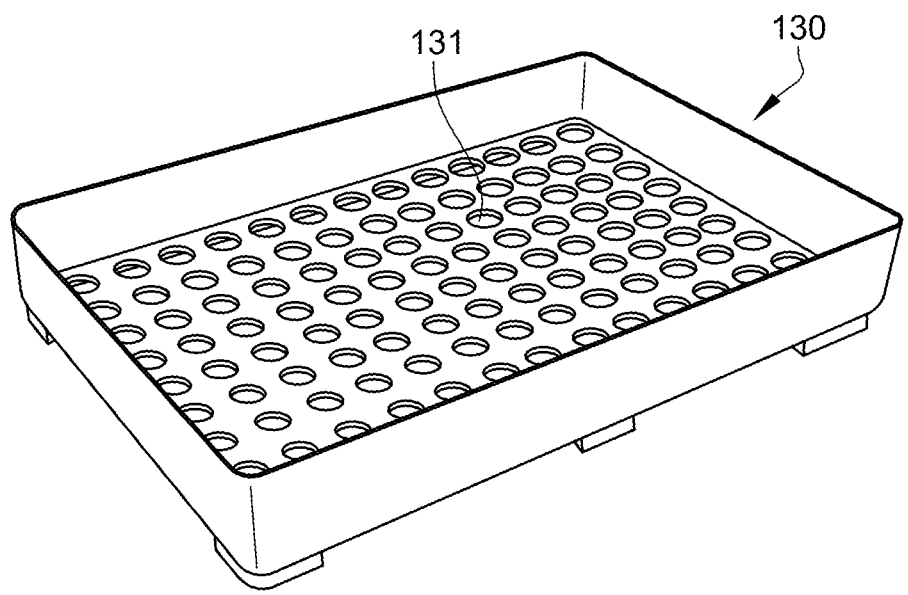
FIG. 2 is a perspective view of another possible variant of a temporary storage tray usable in the device represented in FIG. 1.
Figure 4:
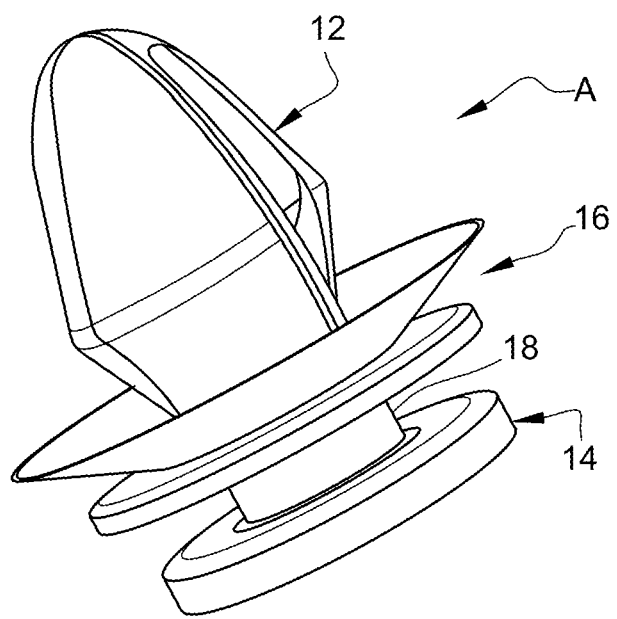
FIG. 4 is a perspective view of a clip intended to be fed into the device of the disclosure.

In the variant represented in FIG. 2, the temporary storage tray 130 is provided with a series of circular-shaped through openings 131, the openings 131 being scattered in an alignment of rows and columns. Each opening 131 is able to contain a clip A having features similar to that represented in FIG. 4, namely a shape in two portions separated by a circular central collar 16. A first portion 12, shaped like a shell, corresponds to the foot of the clip A and is intended to be inserted into a metal sheet of a vehicle frame. A second portion 14, shaped like a disc, corresponds to the head of the clip A and is intended to be inserted into a plastic part covering the frame. The collar 16 is separated from the head 14 by a groove 18. The groove 18 will be dimensioned so as to enable the engagement of the plastic part intended to be fixed to the frame. Each opening 131 thus has a diameter configured to enable the introduction of the foot and/or the head of the clips A but to prevent the passage of the collar 16.

Figure 3:
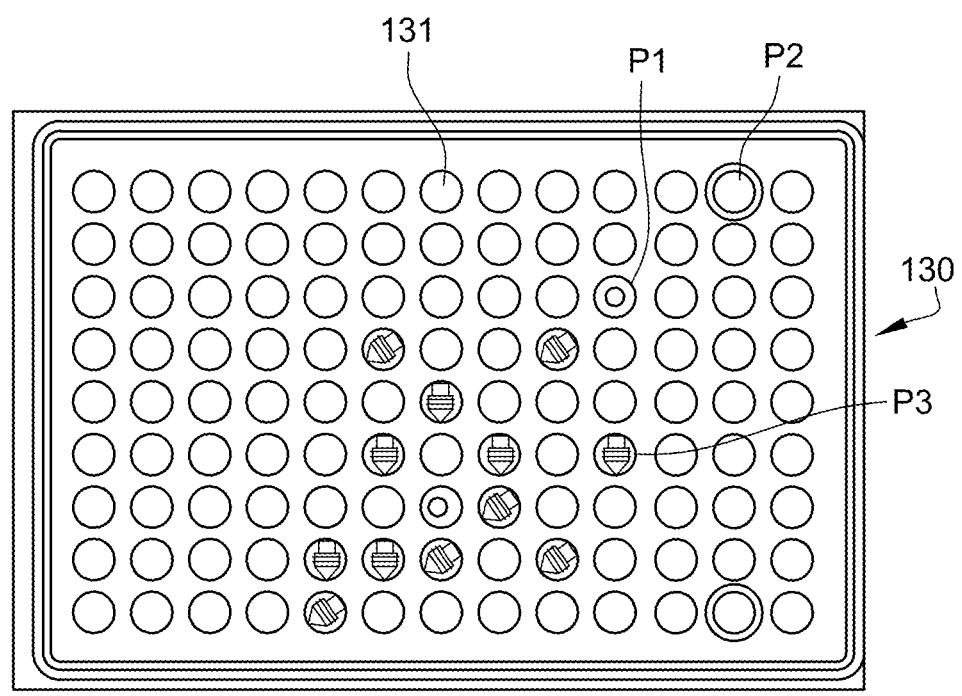
FIG. 3 is a top view of the tray represented in FIG. 2, in which a number of components have been stored.

In this way, and as illustrated in FIG. 3, the clips A will be able to adopt, during the agitation of the tray 130, several possible positions. A first position P1 will correspond to a first preferred stable position for the clip A. In this preferred position, the clip A is positioned such that its foot 12 is disposed completely inside the tray 130, the clip A resting on the upper surface of the tray 130 at the level of its flange 16. The head 14 of the clip A protrudes from the tray 130 and could be easily gripped by the gripping finger 161 of the robot 160. A second position P2 will correspond to a second preferred stable position for the clip A. In this preferred position, the clip A is positioned such that its head 14 is disposed completely inside the tray 130, the clip A resting on the upper surface of the tray 130 at the level of its collar 16. The foot 12 of the clip A protrudes from the tray 130 and could be easily gripped by the gripping finger 161 of the robot 160. A third position P3 will correspond to an unstable position for the clip A. In this unstable position, the clip A is positioned such that its flange 16 is partially engaged within an opening 131 by the edge, the clip A resting on the upper surface of tray 130 at the level of its foot 12 and/or its head 14. In this position, the clip A cannot be easily gripped by the gripping finger 161 of the robot 160. In order to enable the passage of the clip A from the unstable position P3 to one of the stable positions P1 or P2, it will be necessary to carry on, or even to intensify, the agitation of the tray 130.

The invention claimed is:

1. A device for dispensing clip-type components intended in particular for part assembly, the device comprising:
a main store for bulk storage of said components;
a tray for temporary storage of components extracted from the main store configured to temporarily store the components waiting to be transferred out of the device, said tray being mounted in reciprocating translation according to at least one longitudinal direction so as to be able to agitate said temporarily stored components and promote positioning thereof inside said tray according to at least one predetermined stable position related to shape;

an optical detection system configured to detect, among the components temporarily stored inside the temporary storage tray, the components having said predetermined stable position;

a transfer system configured to transfer, individually or in groups, the components having said predetermined stable position to a downstream processing area located outside the device; and an electronic control unit in electronic connection with the optical detection system and the transfer system, said unit being configured to control the transfer system as a function of detection signals received from the optical detection system, wherein the temporary storage tray is provided with a series of individual housings, each of said housings being configured to receive one single component according to said predetermined stable position.

2. The device according to claim 1, wherein each of the individual housings forms a through opening inside the temporary storage tray, said opening being configured to allow the passage of a first portion of the components and prevent the passage of a second portion of the components.

3. The device according to claim 2, wherein the geometry of the opening is adapted to the geometry of the component.

4. The device according to claim 3, wherein each through opening has a circular-shaped section.

5. The device according to claim 1, wherein the individual housings are distributed over the temporary storage tray according to the geometry of the component.

6. The device according to claim 5, wherein the individual housings are regularly spaced over the temporary storage tray.

7. The device according to claim 6, wherein the individual housings are scattered over the temporary storage tray according to a regular alignment of rows and columns.

8. The device according to claim 1, wherein the optical detection system comprises an optical camera oriented so as to view the temporary storage tray from above and an image processing software adapted to receive and analyze the images captured by the optical camera so as to detect the components stored on the temporary storage tray having the predetermined stable position.

9. The device according to claim 1, wherein the transfer system comprises a robot with an articulated arm and having at least one gripping finger configured to individually grip the components stored on the temporary storage tray having the predetermined stable position.

* * * * *